J. GLEASON.
Milk Strainer.
No. 11,221.                     Patented July 4, 1854.
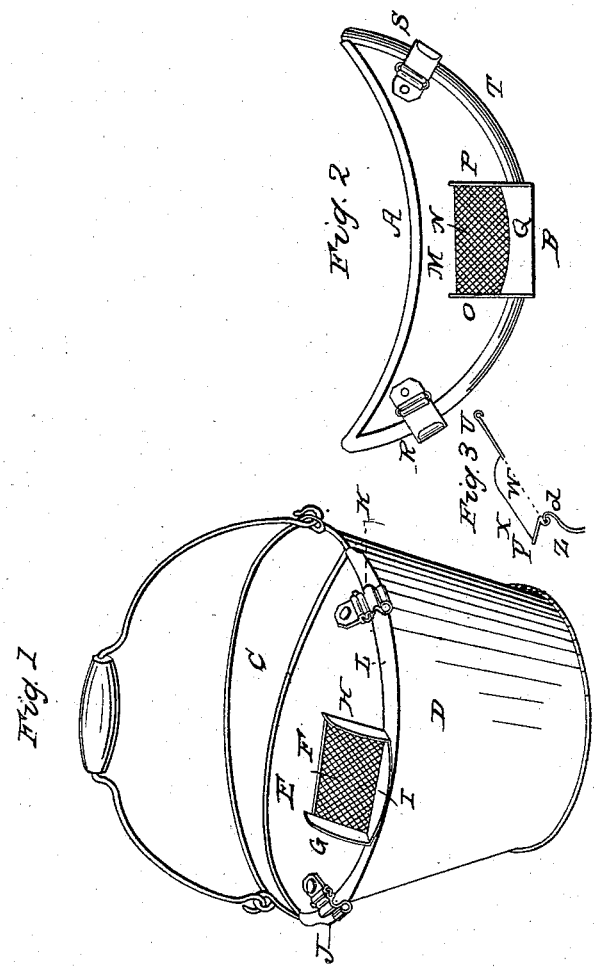

UNITED STATES PATENT OFFICE.

JOEL GLEASON, OF GENEVA, NEW YORK.

MILK-STRAINER.

Specification of Letters Patent No. 11,221, dated July 4, 1854.

*To all whom it may concern:*

Be it known that I, JOEL GLEASON, of Geneva, in the county of Ontario and the State of New York, have invented a new and useful Adjustable Milk-Strainer; and I do hereby declare that the following is a full and exact description thereof, reference being had to the accompanying drawings and to the letters of reference marked thereon.

The nature of my invention consists in constructing an adjustable milk strainer, which may be applied to any pail of suitable dimensions by means of catches and a packing attached to the strainer.

To enable others skilled in the art to make and use my invention, I will proceed to describe its construction and operation by referring to the annexed drawings, in which—

Figure 1 is a perspective view of a pail with my strainer attached. Fig. 2 shows the top of my strainer detached from the pail. Fig. 3 shows a section of the strainer through A B, Fig. 2.

C and D, Fig. 1, show the pail to which the strainer is attached. C shows the inside of the pail, and D the outside.

E, Fig. 1, shows the body of the strainer to which the wire cloth and spout, and also the catches and packing are fixed.

F, Fig. 1, shows the wire cloth, through which the milk is strained.

G H and I, Fig. 1, show the spout around the wire cloth.

J and K, Fig. 1, show the hinged catches by means of which the strainer is held onto the pail.

L, Fig. 1, shows the packing which is fixed to the body of the strainer E by a lock or turning the tin down onto the packing on the underside of the body of the strainer E. The packing is for the purpose of preventing leakage around the edge of the pail and is composed of india rubber cloth or any other material, which will answer the purpose.

M, Fig. 2, shows the body of the strainer shown at E, Fig. 1.

N, Fig. 2, shows the wire cloth through which the milk is strained, and which is shown at F, Fig. 1.

O and P, Fig. 2, show the sides of the spout shown at G and H, Fig. 1.

Q, Fig. 2, shows that part of the spout shown at I Fig. 1.

R and S, Fig. 2, show the hinged catches by which the strainer is held onto the pail, and which are shown at J and K, Fig. 1.

T, Fig. 2, shows the packing, shown at L, Fig. 1.

U and V, Fig. 3, show a section of the body of the strainer shown at E. Fig. 1, and M, Fig. 2.

The dotted line W, Fig. 3, shows a section of the wire cloth shown at F, Fig. 1, and N, Fig. 2.

X, Fig. 3, shows the side of the spout shown at G, Fig. 1, and O, Fig. 2.

Y, Fig. 3, shows a section of the part of the spout shown at I, Fig. 1, and Q, Fig. 2.

Z, Fig. 3, shows a section of the packing shown at L, Fig. 1, and T, Fig. 2.

*a*, Fig. 3, shows the tin bent down or locked onto the packing Z for the purpose of attaching the packing to the body of the strainer.

Now it will be seen that by taking my adjustable strainer as shown Fig. 2, and attaching it to a pail as shown Fig. 1, by putting the front edge of the strainer on the inside of the pail under the wire on the edge of the pail, and letting the packing which is fastened to the underside of the strainer, hang over the wire onto the outside of the pail, and by locking the catches onto the wire, the strainer is held in its place and in the same manner may be applied to any pail of a suitable size, and the milk is poured out through the wire cloth and strained, as in the ordinary way.

Having thus described the construction and operation of my adjustable milk strainer, what I claim as my invention and desire to secure by Letters Patent is—

The combination of the packing L with the hinged catches J and K, the strainer being supported on the pail by means of the packing, in combination with the catches, and the packing being fixed to the body of the strainer E, by locking the tin onto the packing on the underside of the body of the strainer as shown *a*, Fig. 3, all operating in the manner and for the purpose substantially as herein described and set forth.

JOEL GLEASON.

Witnesses:
CHAS. I. FOLGER,
D. W. C. GAGE.